United States Patent
Kim et al.

(10) Patent No.: US 12,476,261 B2
(45) Date of Patent: Nov. 18, 2025

(54) TRANSITION METAL ELECTROCHEMICAL CATALYST PREPARED USING ULTRAFAST COMBUSTION METHOD, AND SYNTHESIS METHOD THEREFOR

(71) Applicants: INDUSTRY FOUNDATION OF CHONNAM NATIONAL UNIVERSITY, Gwangju (KR); SEOUL NATIONAL UNIVERSITY R&DB FOUNDATION, Seoul (KR); POSTECH RESEARCH AND BUSINESS DEVELOPMENT FOUNDATION, Gyeongsangbuk-do (KR); INSTITUTE FOR BASIC SCIENCE, Daejeon (KR)

(72) Inventors: Jae Kook Kim, Gwangju (KR); Yung Eun Sung, Seoul (KR); Kug Seung Lee, Gyeongsangbuk-do (KR); Mi Ju Kim, Seoul (KR); Sung Jin Kim, Gwangju (KR)

(73) Assignees: INDUSTRY FOUNDATION OF CHONNAM NATIONAL UNIVERSITY, Gwangju (KR); SEOUL NATIONAL UNIVERSITY R&DB FOUNDATION, Seoul (KR); POSTECH RESEARCH AND BUSINESS DEVELOPMENT FOUNDATION, Gyeongsangbuk-do (KR); INSTITUTE FOR BASIC SCIENCE, Daejeon (KR)

( * ) Notice: Subject to any disclaimer, the term of this patent is extended or adjusted under 35 U.S.C. 154(b) by 824 days.

(21) Appl. No.: 17/766,273

(22) PCT Filed: Oct. 8, 2020

(86) PCT No.: PCT/KR2020/013777
§ 371 (c)(1),
(2) Date: Apr. 4, 2022

(87) PCT Pub. No.: WO2021/071302
PCT Pub. Date: Apr. 15, 2021

(65) Prior Publication Data
US 2022/0336821 A1    Oct. 20, 2022

(30) Foreign Application Priority Data

Oct. 10, 2019  (KR) .......................... 10-2019-0125502

(51) Int. Cl.
H01M 4/90        (2006.01)
H01M 4/88        (2006.01)

(52) U.S. Cl.
CPC ....... H01M 4/9083 (2013.01); H01M 4/8828 (2013.01); H01M 4/9025 (2013.01)

(58) Field of Classification Search
CPC ... B01J 21/18; B01J 23/38; B01J 23/16; B01J 23/70; B01J 35/33; B01J 37/08;
(Continued)

(56) References Cited

U.S. PATENT DOCUMENTS

| | | | |
|---|---|---|---|
| 8,962,513 B2* | 2/2015 | Liu | B01J 27/24 502/200 |
| 2011/0104553 A1* | 5/2011 | Pol | H01M 4/366 429/188 |

(Continued)

FOREIGN PATENT DOCUMENTS

| | | |
|---|---|---|
| CN | 102971249 A | 3/2013 |
| CN | 103718358 A | 4/2014 |

(Continued)

OTHER PUBLICATIONS

English translation of Written Opinion for PCT/KR2020/013777. (Year: 2021).*

(Continued)

*Primary Examiner* — Patricia L. Hailey
(74) *Attorney, Agent, or Firm* — The PL Law Group, PLLC

(57) ABSTRACT

A method for preparing a transition metal electrochemical catalyst according to an embodiment of the present disclosure includes dissolving a nitrogen precursor and a transition metal precursor in a polyol-based solvent so as to prepare a solution in which transition metal ions and free anions are coordinated, and mixing same with a support so as to prepare a mixture, igniting the mixture so as to carbonize the (Continued)

Step 1: perform ultrafast combustion method on prepared precursors   Step 2: reduce materials through heat treatment, acid treatment, and additional heat treatment   Completed transition metal composite structured nanocatalyst Transition metal-nitrogen-carbon complex   Polyol Transition metal oxide    Transition metal-nitrogen bonding structure Transition metal nanoparticles encompassed by carbon layers polyol-based solvent, thereby forming transition metal nanoparticles encompassed by carbon, performing heat treatment in order to carbonize remaining organic matter contained in the mixture, and removing, through acid treatment, impurities and transition metal nanoparticles not encompassed by carbon, and then removing remaining acid through washing and additional heat treatment, thereby a nanocatalyst having a structure in which a single-atom transition metal-nitrogen bonding structure and/or transition metal nanoparticles encompassed by carbon exist is synthesized.

12 Claims, 7 Drawing Sheets

(58) Field of Classification Search
CPC ........ B01J 37/084; B01J 35/505; B01J 35/53; H01M 4/9083; H01M 4/8828; H01M 4/9025
USPC ............................ 502/185; 429/523; 977/773
See application file for complete search history.

(56) References Cited

U.S. PATENT DOCUMENTS

| 2014/0170527 | A1* | 6/2014 | Lee | H01M 4/88 |
| | | | | 423/365 |
| 2014/0220479 | A1* | 8/2014 | Chen | H01M 4/9041 |
| | | | | 502/185 |

FOREIGN PATENT DOCUMENTS

| EP | 2744025 A1 | 6/2014 | |
| JP | 2018-133216 A | * 8/2018 | ............. B01J 23/89 |
| KR | 10-0999163 B1 | 12/2010 | |
| KR | 10-1759989 B1 | 7/2017 | |
| KR | 10-2017-0088156 A | 8/2017 | |

OTHER PUBLICATIONS

International Search Report for PCT/KR2020/013777 mailed on Feb. 3, 2021.
Office action issued on Aug. 17, 2023 from China Patent Office in a counterpart China Patent Application No. 202080085149.8 (English translation is also submitted herewith.).

* cited by examiner

FIG. 2
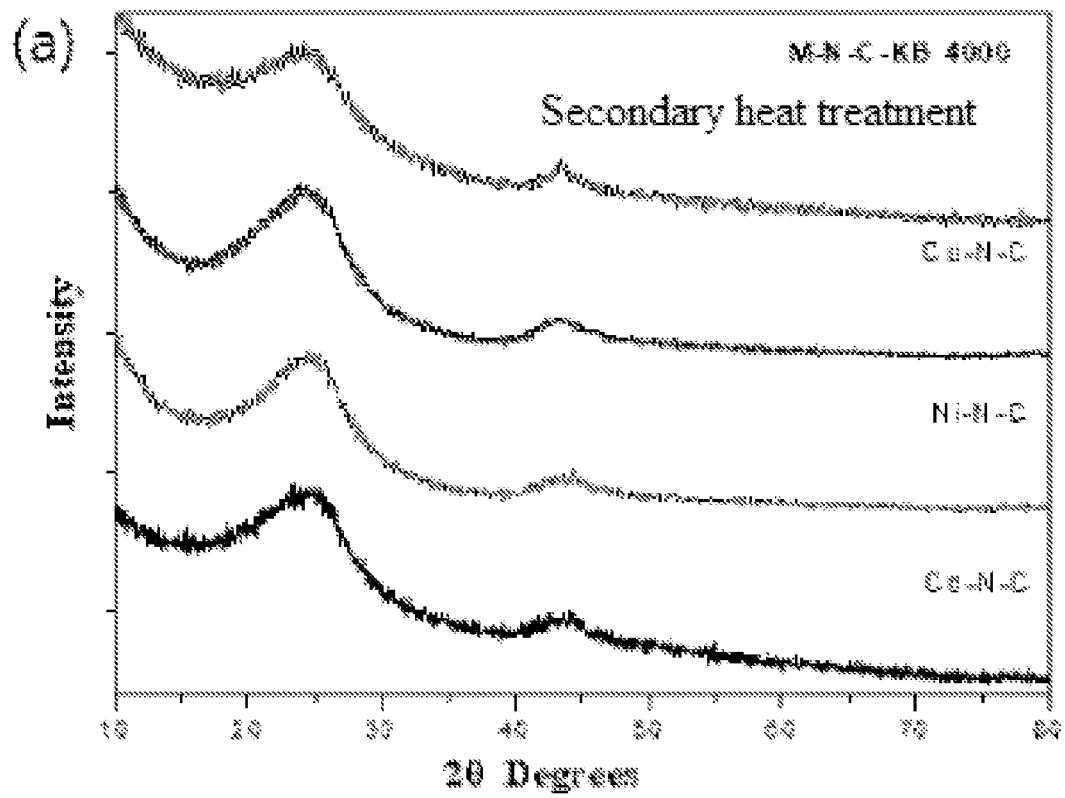
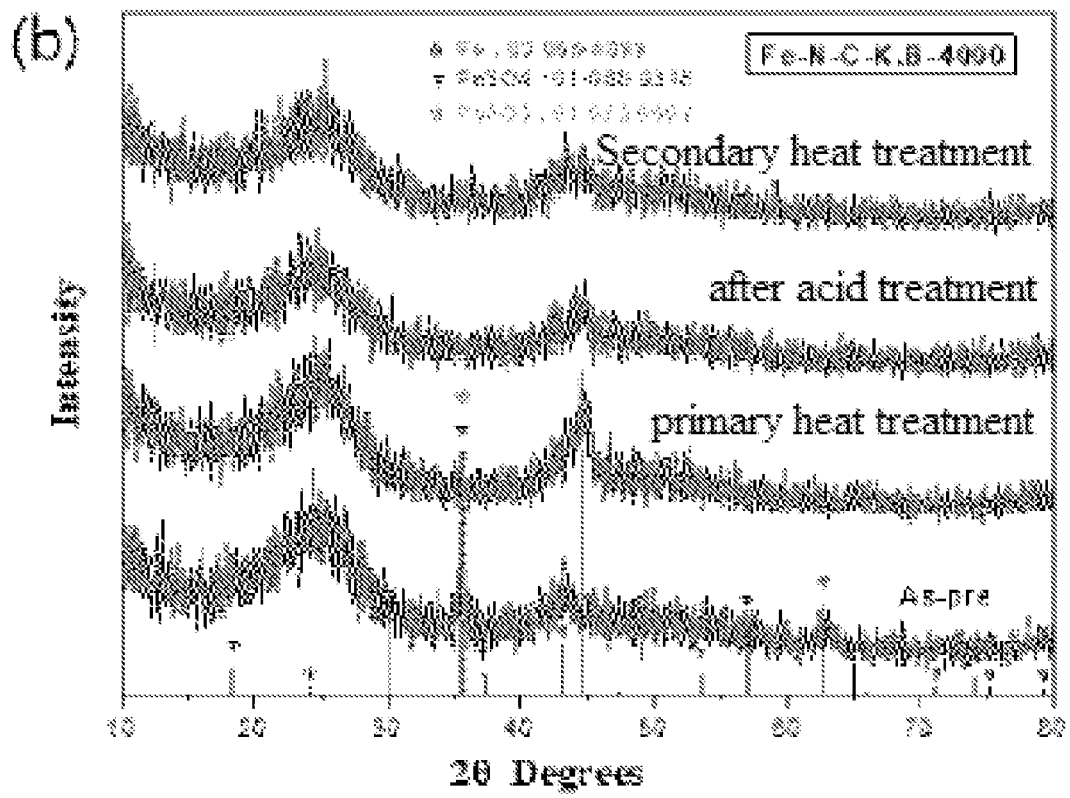

FIG. 3
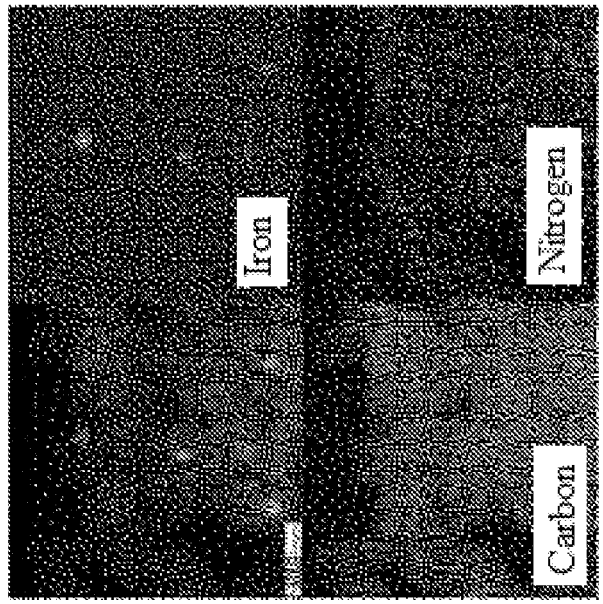
EDS mapping result of transition metal composite structured nanocatalyst synthesized according to Example 1
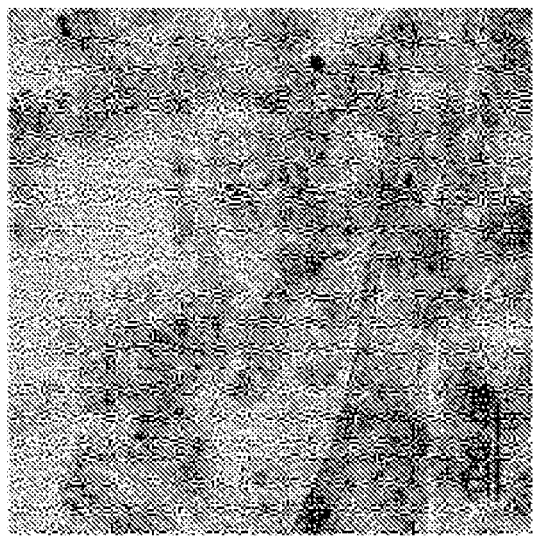
Transition metal composite structured nanocatalyst synthesized according to Example 1

TRANSITION METAL ELECTROCHEMICAL CATALYST PREPARED USING ULTRAFAST COMBUSTION METHOD, AND SYNTHESIS METHOD THEREFOR

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/013777, filed Oct. 8, 2020, which claims priority to the benefit of Korean Patent Application No. 10-2019-0125502 filed in the Korean Intellectual Property Office on Oct. 10, 2019, the entire contents of which are incorporated herein by reference.

BACKGROUND

1. Technical Field

The present disclosure relates generally to a transition metal electrochemical catalyst prepared using an ultrafast combustion method, and a synthesis method therefor. More particularly, the present disclosure relates to a transition metal electrochemical catalyst prepared using an ultrafast combustion method, and a synthesis method therefor, in which a composite structured catalyst in which a single-atom transition metal-nitrogen bond structure and transition metal nanoparticles encompassed by carbon layers exist simultaneously is synthesized by carbonizing and oxidizing various transition metals, nitrogen, and carbon-containing precursors through ultrafast combustion and performing additional acid treatment and heat treatment.

2. Background Art

To deal with environmental pollution caused by fossil fuels and the increasing demand for energy, eco-friendly energy technologies are attracting global attention lately. Fuel cells, metal-air cells, and water electrolyzers, which are representative examples of energy storage and conversion devices, are in the spotlight. Along with this trend, studies are actively being conducted on oxygen reduction reaction (ORR), oxygen evolution reaction (OER), hydrogen oxidation reaction (HOR), hydrogen evolution reaction (HER), which are the basic electrochemical reactions in such technologies. However, effective catalysts are required to solve the slow rate and high overpotential of such electrochemical reactions. In the production of noble metal-based catalysts, which are the most active catalysts, it is required to reduce the consumption of platinum or iridium because of their small reserves and high price.

To reduce the consumption of noble metal materials, studies have been conducted on catalysts using non-noble metals. In particular, transition metal catalysts are now attracting great attention as it has been reported that they have excellent activity comparable to noble metal-based catalysts. These transition metal catalysts are used in the form of various transition metal compounds and are mainly used in the form supported on activated carbon. Many recent studies have emerged showing that among the various transition metal compounds, a transition metal-nitrogen-carbon bonding structure in which the transition metal is distributed in a single-atom form is an active site that exhibits high performance in various electrochemical reactions. Also, in catalysts using transition metals, in addition to the single-atom transition metal-nitrogen bonding structure, transition metal nanoparticles surrounded by a carbon layer have been known as active sites for electrochemical reactions. It is thus expected that a catalyst having the best activity for electrochemical reactions can be obtained by synthesis of a catalyst having an appropriate combination of such two active sites.

Several synthesis methods have been presented in previous studies on transition metal catalysts. However, such synthesis methods do not provide electrochemical catalysts with high performance and economic feasibility sufficient for practical applications because the synthesis process is complicated and the carbon structure is limited. Ultrafast combustion is a method of synthesizing a material by directly burning a precursor using a polyol-based solvent and offers the advantage of enabling mass synthesis and easily yielding nanomaterials at a short process time and low process cost. The ultrafast combustion method has been mainly used for the synthesis of nanoscale oxides with high crystallinity, and have never been applied to the above-mentioned ORR, OER, HER, and HOR until now.

SUMMARY

Accordingly, the present disclosure has been made keeping in mind the above problems occurring in the related art, and an objective of the present disclosure is to provide a transition metal electrochemical catalyst prepared using an ultrafast combustion method, and a synthesis method therefor that provide a catalyst having excellent electrochemical properties as a catalyst electrode due to its structure in which a single-atom transition metal-nitrogen bonding structure and transition metal nanoparticles encompassed by carbon layers, which serve as different electrochemical reaction active sites, are supported on the carbon surface.

Another objective of the present disclosure is to provide a transition metal electrochemical catalyst prepared using an ultrafast combustion method, and a synthesis method therefor that not only simplify the complicated processes required to simultaneously form the above-mentioned active sites by utilizing the ultrafast combustion method, but also suppress a part of the oxidation reaction of transition metals occurring during a synthesis process by simultaneously providing an oxidizing atmosphere and a reducing atmosphere.

Meanwhile, the objectives of the present disclosure are not limited to those mentioned above, and other objectives not mentioned will be clearly understood by those skilled in the art from the following description.

In order to accomplish the above objectives, according to one aspect of the present disclosure, there is provided a method of synthesizing a transition metal electrochemical catalyst using an ultrafast combustion method, the method including: a) dissolving a nitrogen precursor and a transition metal precursor in a polyol-based solvent so as to prepare a solution in which transition metal ions and free radical anions are coordinated, and mixing the solution with a support so as to prepare a mixture; b) igniting the mixture having been prepared in step a) so as to carbonize the polyol-based solvent, thereby forming transition metal nanoparticles encompassed by carbon; c) performing heat treatment in order to carbonize organic residue contained in the mixture; and d) removing, through acid treatment, impurities and transition metal nanoparticles not encompassed by carbon, and then removing remaining acid through washing and additional heat treatment.

A nanocatalyst having a structure in which a single-atom transition metal-nitrogen bonding structure and/or transition metal nanoparticles encompassed by carbon exist can be synthesized through steps a) to d).

In step a), the mixture in which a transition metal-nitrogen-carbon complex, the support, and the polyol-based solvent are mixed may be prepared by dissolving the transition metal precursor and the nitrogen precursor in the polyol-based solvent.

The polyol-based solvent may be any one selected from the group consisting of tetraethylene glycol, ethylene glycol, diethylene glycol, triethylene glycol, and butylene glycol.

The nitrogen precursor may be a monomer of multi-ring structure containing nitrogen, and is 1,10-phenanthroline, 1,10-phenanthroline-5-amine, or 2,2-bipyridine.

The support may be any one selected from the group consisting of is carbon black, graphene, carbon nanotubes, carbon nanofibers, silica ($SiO_2$), titania ($TiO_2$), zirconium oxide ($ZrO_2$), polyaniline, polypyrrole, and silicon carbide (SiC).

The transition metal precursor and the nitrogen precursor may be mixed in a molar ratio of 1:0.5 to 1:10.

The support and the polyol-based solvent may be mixed in a mass ratio of 1:2 to 1:60.

The transition metal precursor may be a transition metal in the 3rd to 5th periods.

Step b) may be performed by blocking a combustion condition of the ultrafast combustion method in order to control the degree of carbonization of the polyol-based solvent and the degree of oxidation of the transition metal.

The heat treatment in step c) may be performed at a temperature of 500° C. to 1,000° C. for 30 minutes to 12 hours under a flow of inert gas or ammonia gas.

The inert gas may be any one selected from the group consisting of nitrogen ($N_2$), argon (Ar), helium (He), a mixed gas of inert gas and hydrogen ($H_2$), and ammonia gas.

The acid treatment in step d) may be performed at a temperature of 0° C. to 90° C. for 30 minutes to 12 hours.

The present disclosure has the following excellent effects.

The present disclosure provides a catalyst having excellent electrochemical properties as a catalyst electrode due to its structure in which a single-atom transition metal-nitrogen bonding structure and transition metal nanoparticles encompassed by carbon layers, which serve as different electrochemical reaction active sites, are supported on the carbon surface.

In addition, the present disclosure not only simplifies the complicated processes required to simultaneously form the above-mentioned active sites by utilizing the ultrafast combustion method, but also suppresses a part of the oxidation reaction of transition metals occurring during a synthesis process by simultaneously providing an oxidizing atmosphere and a reducing atmosphere.

BRIEF DESCRIPTION OF THE DRAWINGS

FIG. 2 illustrates graphs showing an X-ray diffraction (XRD) analysis result of transition metal electrochemical catalysts synthesized according to the embodiment of the present disclosure.

FIG. 3 illustrates a scanning electron micrograph (SEM) image and energy dispersive spectroscopy (EDS) analysis result of a transition metal electrochemical catalyst synthesized according to the embodiment of the present disclosure.

DETAILED DESCRIPTION

A transition metal electrochemical catalyst synthesis method using an ultrafast combustion method according to the present disclosure includes the steps of: a) dissolving a nitrogen precursor and a transition metal precursor in a polyol-based solvent so as to prepare a solution in which transition metal ions and free radical anions are coordinated, and mixing the solution with a support so as to prepare a mixture; b) igniting the mixture having been prepared in step a) so as to carbonize the polyol-based solvent, thereby forming transition metal nanoparticles encompassed by carbon; c) performing heat treatment in order to carbonize organic residue contained in the mixture; and d) removing, through acid treatment, impurities and transition metal nanoparticles not encompassed by carbon, and then removing remaining acid through washing and additional heat treatment. Here, a nanocatalyst having a structure in which a single-atom transition metal-nitrogen bonding structure and/or transition metal nanoparticles encompassed by carbon exist is synthesized through steps a) to d).

Although the terms used in the present disclosure are selected as general terms that are widely used currently, some of the terms in specific cases have been arbitrarily selected by the applicant. In this case, the meanings of the terms should be construed by taking into consideration not the simple names of the terms but the meanings of the terms described or used in the detailed description of the disclosure.

Hereinafter, the technical configuration of the present disclosure will be described in detail with reference to exemplary embodiments illustrated in the accompanying drawings.

Figure 1:
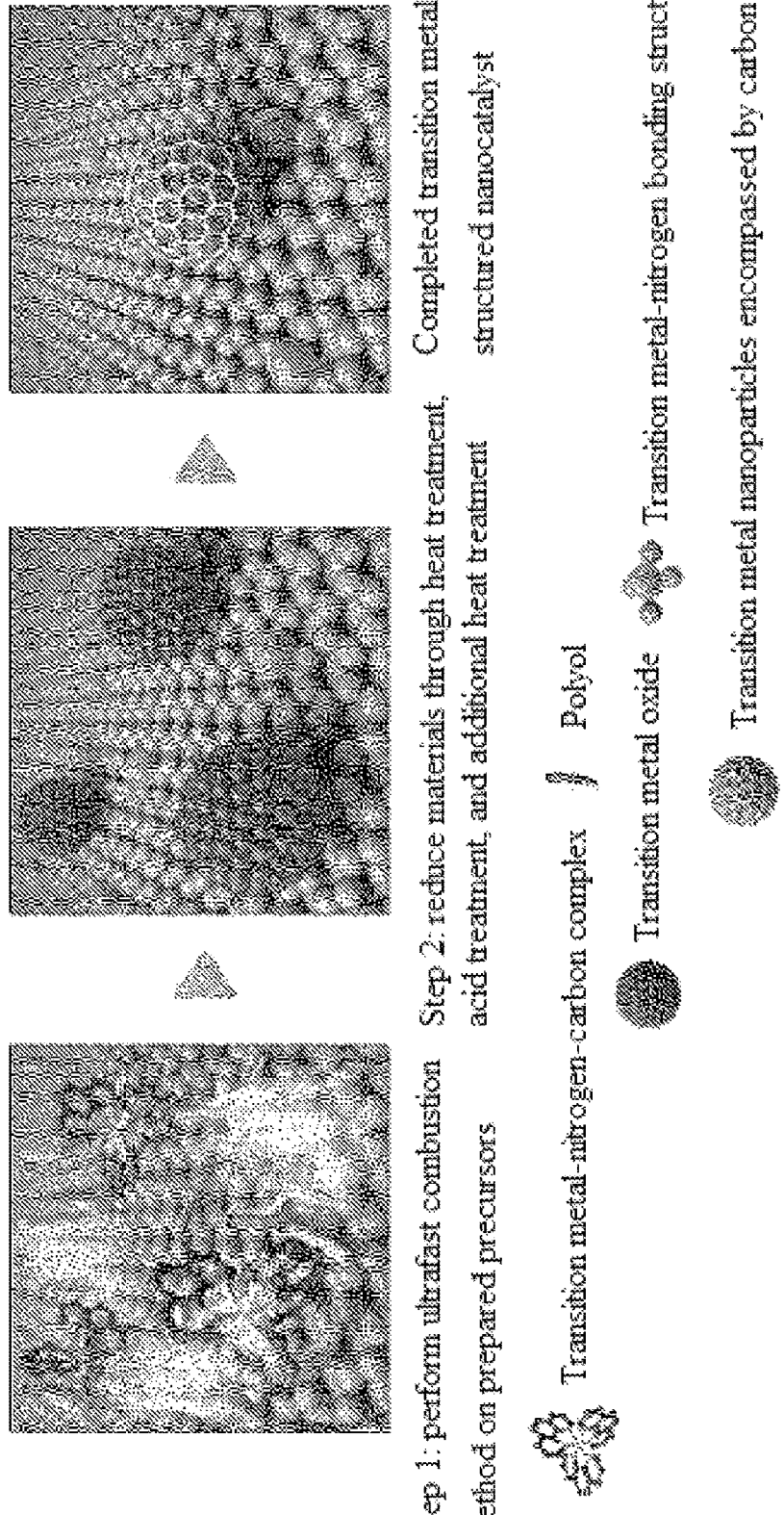
FIG. 1 illustrates a view schematically showing a transition metal electrochemical catalyst synthesis method using an ultrafast combustion method according to an embodiment of the present disclosure.
Figure 4:
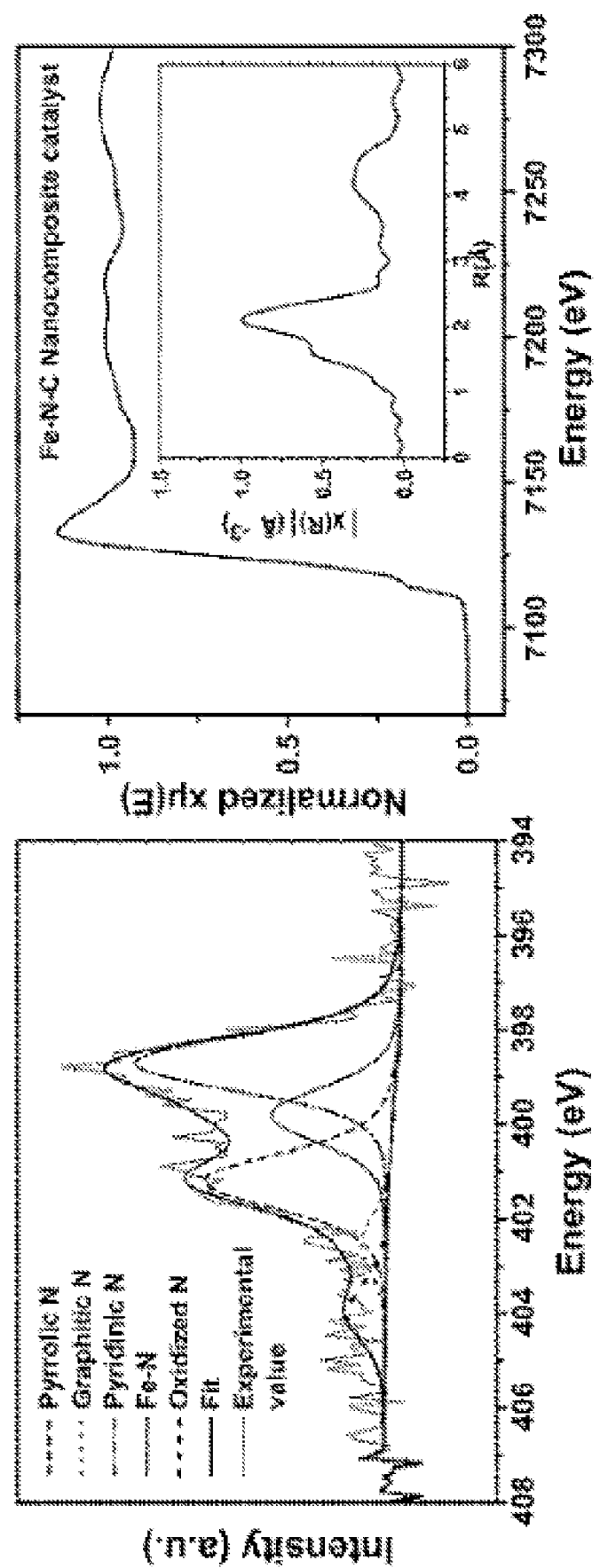
FIG. 4 illustrates graphs showing X-ray photoelectron spectroscopy (XPS) and X-ray absorption spectroscopy (XAS) analysis results of the transition metal electrochemical catalyst synthesized according to the embodiment of the present disclosure.
Figure 5:
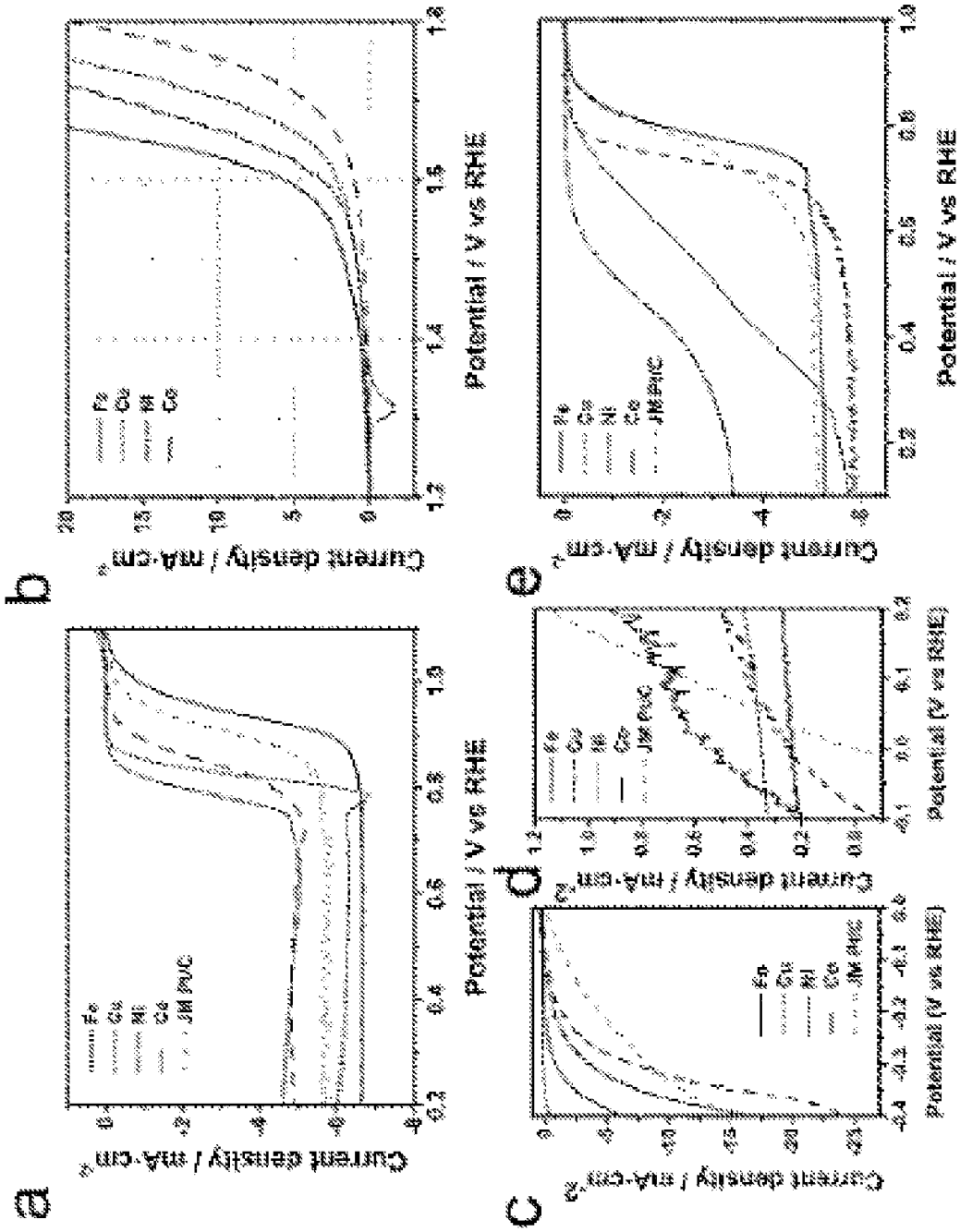
FIG. 5 illustrates graphs showing a half-cell experiment result showing various electrochemical activities of transition metal electrochemical catalysts synthesized according to the embodiment of the present disclosure.
Figure 6:
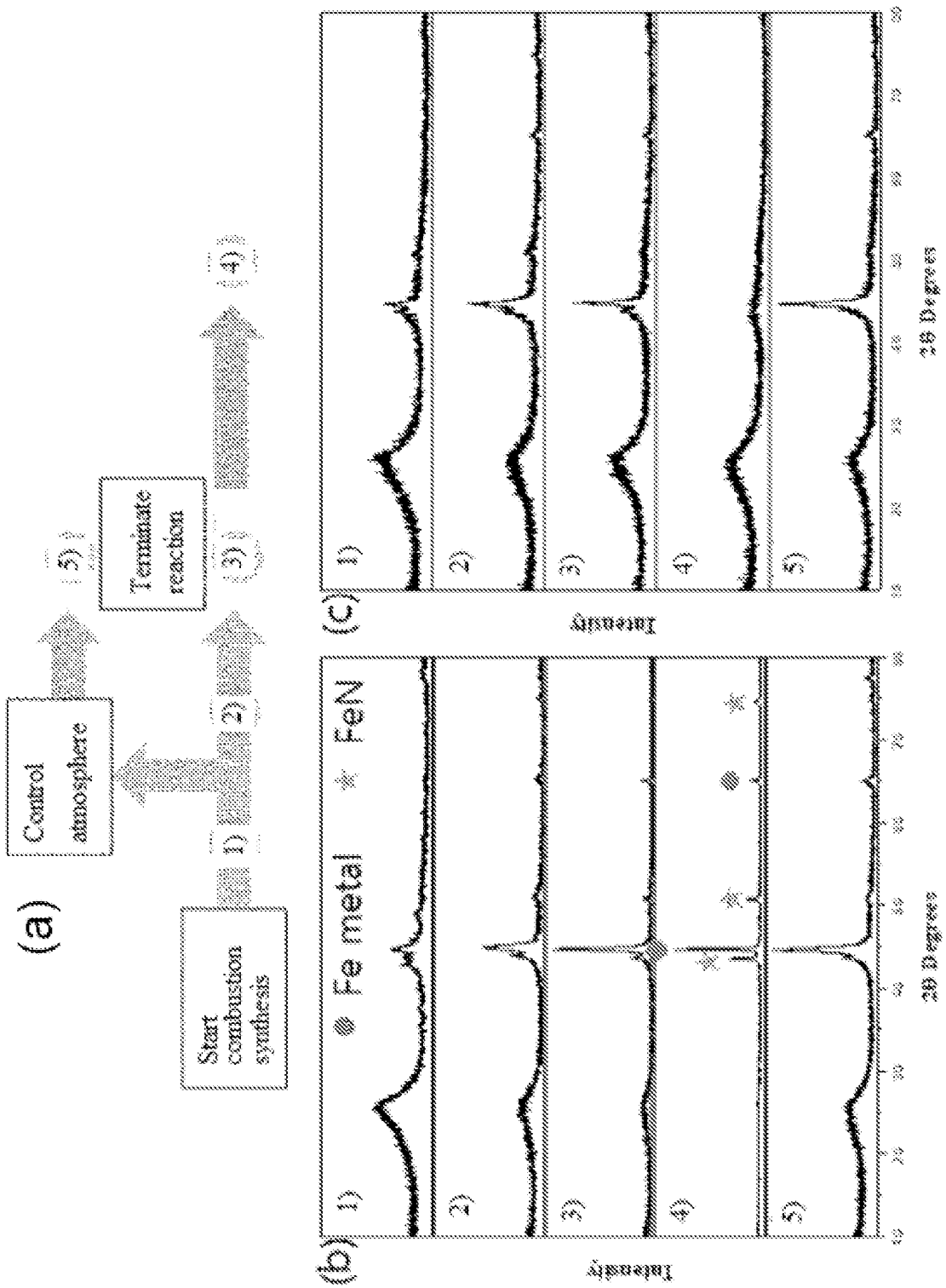
FIG. 6 illustrates a schematic view ((a) of FIG. 6) of the process steps for blocking the combustion condition described in the embodiment of the present disclosure and graphs ((b) and (c) of FIG. 6) showing XRD patterns of samples in which the combustion condition is blocked through the process steps illustrated in (a) of FIG. 6.
Figure 7:
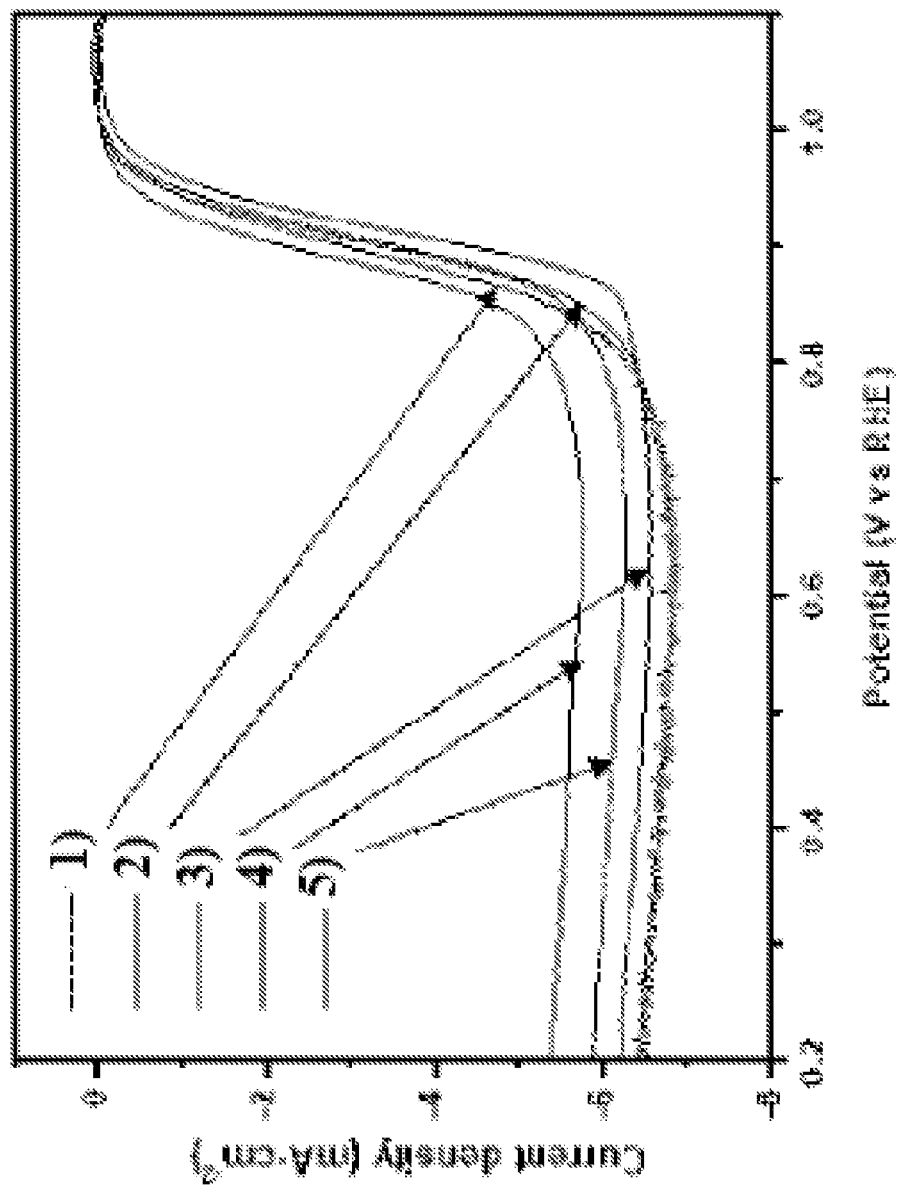
FIG. 7 illustrates a graph showing an analysis result of oxygen reduction reaction (ORR) characteristics of the samples in which the combustion condition is blocked through the process steps illustrated in (a) of FIG. 6.

FIG. 1 illustrates a view schematically showing a transition metal electrochemical catalyst synthesis method using an ultrafast combustion method according to an embodiment of the present disclosure. FIG. 2 illustrates graphs showing an X-ray diffraction (XRD) analysis result of transition metal electrochemical catalysts synthesized according to the embodiment of the present disclosure. FIG. 3 illustrates a scanning electron micrograph (SEM) image and energy dispersive spectroscopy (EDS) analysis result of a transition metal electrochemical catalyst synthesized according to the embodiment of the present disclosure. FIG. 4 illustrates graphs showing X-ray photoelectron spectroscopy (XPS) and X-ray absorption spectroscopy (XAS) analysis results of the transition metal electrochemical catalyst synthesized according to the embodiment of the present disclosure. FIG. 5 illustrates graphs showing a half-cell experiment result showing various electrochemical activities of transition metal electrochemical catalysts synthesized according to the embodiment of the present disclosure. FIG. 6 illustrates a schematic view ((a) of FIG. 6) of the process steps for blocking the combustion condition described in the embodiment of the present disclosure and graphs ((b) and (c) of FIG. 6) showing XRD patterns of samples in which the combustion condition is blocked through the process steps illustrated in (a) of FIG. 6. FIG. 7 illustrates a graph showing an analysis result of oxygen reduction reaction (ORR) characteristics of the samples in which the combustion condition is blocked through the process steps illustrated in (a) of FIG. 6.

Referring to FIGS. 1 to 7, the transition metal electrochemical catalyst synthesis method using the ultrafast combustion method according to the embodiment of the present disclosure includes the steps of: a) dissolving a nitrogen precursor and a transition metal precursor in a polyol-based solvent so as to prepare a solution in which transition metal ions and free radical anions are coordinated, and mixing the solution with a support so as to prepare a mixture; b) igniting the mixture having been prepared in step a) so as to carbonize the polyol-based solvent, thereby forming transition metal nanoparticles encompassed by carbon; c) performing heat treatment in order to carbonize organic residue contained in the mixture; and d) removing, through acid treatment, impurities and transition metal nanoparticles not encompassed by carbon, and then removing remaining acid through washing and additional heat treatment.

Here, in the transition metal electrochemical catalyst synthesis method using the ultrafast combustion method according to the embodiment of the present disclosure, a nanocatalyst having a composite structure in which a single-atom transition metal-nitrogen bonding structure and transition metal nanoparticles encompassed by carbon exist simultaneously is synthesized through steps a) to d).

Meanwhile, in step a), the mixture in which a transition metal-nitrogen-carbon complex, the support, and the polyol-based solvent are mixed is prepared by dissolving the transition metal precursor and the nitrogen precursor in the polyol-based solvent. In step a), a transition metal binds with a free radical containing nitrogen to form the transition metal-nitrogen-carbon complex. The transition metal-nitrogen-carbon complex prevents rapid aggregation of transition metal ions during the combustion reaction and heat treatment process, thereby facilitating the formation of single-atom or tens of nanometer-sized nanoparticles.

Meanwhile, in the transition metal electrochemical catalyst synthesis method using the ultrafast combustion method according to the embodiment of the present disclosure, the polyol-based solvent not only provides energy for synthesizing transition metal nanoparticles by causing a series of exothermic reactions during the reaction but also forms a carbon layer to inhibit particle growth. In one embodiment of the present disclosure, as the polyol-based solvent, there may be used any one selected from the group consisting of tetraethylene glycol, ethylene glycol, diethylene glycol, triethylene glycol, and butylene glycol.

In addition, the nitrogen precursor is a monomer of multi-ring structure containing nitrogen, and may be 1,10-phenanthroline, 1,10-phenanthroline-5-amine, or 2,2-bipyridine. The support may include a carbon material capable of supporting transition metal nanoparticles, a metal oxide, a polymer, carbide, etc. In one embodiment of the present disclosure, as the support, there may be used any one selected from the group consisting of is carbon black, graphene, carbon nanotubes, carbon nanofibers, silica ($SiO_2$), titania ($TiO_2$), zirconium oxide ($ZrO_2$), polyaniline, polypyrrole, and silicon carbide (SiC).

Meanwhile, in the transition metal electrochemical catalyst synthesis method using the ultrafast combustion method according to the embodiment of the present disclosure, the transition metal precursor and the nitrogen precursor are mixed in a molar ratio of 1:0.5 to 1:10, and the support and the polyol-based solvent are mixed in a mass ratio of 1:2 to 1:60.

Meanwhile, in the transition metal electrochemical catalyst synthesis method using the ultrafast combustion method according to the embodiment of the present disclosure, the transition metal precursor may be a transition metal in the 3rd to 5th periods that may have a structure coordinated with the nitrogen precursor. In one embodiment of the present disclosure, as the transition metal precursor, there may be used any one selected from the 3th period transition metals (Sc, Ti, V, Cr, Mn, Fe, Co, Ni, Cu, and Zn), the 4th period transition metals (Y, Zr, Nb, Mo, Tc, Ru, Rh, Pd, Ag, and Cd), and the 5th period transition metals (Hf, Ta, W, Re, Os, Ir, Pt, Au, and Hg).

More specifically, when the transition metal precursor is an ion precursor, it may be selected from the group consisting of $Fe(CH_3COO)_2$, $Fe(NO_3)_2$, $FeC_2O_2$, $FeSO_4$, $FeCl_2$, and hydrates thereof. When the transition metal precursor is a copper precursor, it may be selected from the group consisting of $Cu(CH_3COO)_2$, $Cu(NO_3)_2$, $CuSO_4$, $CuC_2O_2$, $CuCl_2$, and hydrates thereof. When the transition metal precursor is a cobalt precursor, it may be selected from the group consisting of $Co(CH_3COO)_2$, $Co(NO_3)_2$, $CoSO_4$, $CoC_2O_2$, $CoCl_2$, and hydrates thereof. When the transition metal precursor is a nickel precursor, it may be selected from the group consisting of $Ni(CH_3COO)_2$, $Ni(NO_3)_2$, $NiSO_4$, $NiC_2O_2$, $NiCl_2$, and hydrates thereof. When the transition metal precursor is a manganese precursor, it may be selected from the group consisting of $Mn(CH_3COO)_2$, $M_n(NO_3)_2$, $MnSO_4$, $MnC_2O_2$, $MnCl_2$, and hydrates thereof.

Meanwhile, step b) is a step of causing a combustion reaction by igniting the solution or mixture prepared in step a). In this step, a single-atom transition metal-nitrogen bonding structure, transition metal nanoparticles, and transition metal oxide are simultaneously formed.

That is, the transition metal electrochemical catalyst synthesis method using the ultrafast combustion method according to the embodiment of the present disclosure enables simultaneous formation of two active sites, i.e., the single-atom transition metal-nitrogen bonding structure and the transition metal nanoparticles.

As described above, the two active sites can be simultaneously formed by the transition metal electrochemical catalyst synthesis method using the ultrafast combustion method according to the embodiment of the present disclosure. However, in another embodiment of the present disclosure, the ratio of the precursors may be controlled so that any one of the active sites exists.

Meanwhile, the polyol-based solvent provides a reducing atmosphere and thermal energy during the reaction to facilitate the reduction of transition metal ions, and inhibits rapid growth of the transition metal while forming a carbon layer together with nitrogen-containing free radicals.

At this time, there is a possibility that a combustion reaction by carbon may occur in step b) in addition to the combustion reaction of the polyol, and the combustion reaction time and atmosphere are not particularly limited as long as they can increase the dispersion efficiency of a carbon support.

Meanwhile, the steps c) and d) are post-treatment steps for removing impurities and reducing the surface of materials through additional heat treatment and acid treatment. In these steps, the transition metal oxide-nitrogen-carbon/support synthesized in step a) is developed into a composite structured catalyst in which a single-atom transition metal-nitrogen bonding structure and transition metal nanoparticles encompassed by carbon layers exist simultaneously.

At this time, step c) may be performed using a heating device such as a tube furnace under a flow of gas. As the gas, there may be used at least one inert gas selected from the group consisting of nitrogen ($N_2$), argon (Ar), helium (He), and neon (Ne), a mixed gas (inert gas and hydrogen ($H_2$)), or ammonia gas.

In addition, the heat treatment may be performed at a temperature of 500° C. to 1000° C. for 30 minutes to 12 hours. However, the performance of the heat treatment and the state of the metal may vary depending on the temperature. A sample resulting from the heat treatment is cooled to room temperature.

Meanwhile, step d) is performed in an aqueous solution of a strong acid. More specifically, the sample resulting from the heat treatment is mixed with an aqueous sulfuric acid solution. The mixture is acid-treated at a temperature of 0° C. to 90° C. and then stirred and reacted for 30 minutes to 12 hours.

After the stirring and reaction are completed, the solution and the catalyst are separated using a filter, and at the same time, the catalyst is washed with distilled water to remove the remaining acid solution. Thereafter, drying is performed.

At this time, the collected catalyst is dried in an oven at 70° C. for at least 12 hours. Then, the dried catalyst was heat-treated under the same limiting conditions as those in the previous heat treatment. However, the conditions are not necessarily the same, and the performance of the heat treatment and the state of the metal may vary depending on the temperature.

As a result, in the transition metal electrochemical catalyst synthesis method using the ultrafast combustion method according to the embodiment of the present disclosure, a nanocatalyst having a structure in which the single-atom transition metal-nitrogen bonding structure and/or the transition metal nanoparticles encompassed by carbon layers exists is synthesized.

In particular, since the catalyst synthesized by the above-described synthesis method has the two active sites simultaneously, the performance of the catalyst can be maximized. Also, the catalyst is useful for mass synthesis and thus is economically feasible.

Therefore, the transition metal electrochemical catalyst according to the present disclosure helps energy conversion and storage cost reduction by exhibiting excellent economic feasibility in terms of both raw material and method, and can find applications in energy devices requiring high performance, consequently contributing to the commercialization of various energy and storage devices.

Hereinafter, examples of the transition metal electrochemical catalyst synthesis method using the ultrafast combustion method will be described in more detail. However, these examples are only for illustrative purpose for providing better understanding of the present disclosure, and the scope of is not limited to these examples.

Example 1

(1) Synthesis of Transition Metal Oxide-Nitrogen-Carbon/Support

Transition metal (Fe, Co, Cu, and Ni) acetate and 1,10-phenanthroline were sufficiently dissolved in tetraethylene glycol for 24 hours to prepare a solution. More specifically, the molar ratio of the precursors used in the solution preparation step is 1:4 (transition metal acetate: 1,10-phenanthroline), and 0.006 mole of transition metal per 48 ml of tetraethylene glycol was used. Then, 4 g of carbon black was dispersed in or mixed with the solution.

(2) Combustion Synthesis

The prepared solution or mixture was placed in an aluminum container and then subjected to a combustion reaction on a flat heating plate heated to a temperature of about 550° C. After the combustion reaction, the aluminum container was covered with a cover and then cooled by air to recover particles.

(3) Reduction and Impurity Removal Through Additional Treatment

The synthesized iron-nitrogen-carbon complex/iron oxide/carbon black was heat-treated in a tube furnace for material reduction. The heat treatment was performed at 800° C. for 1 hour under a flow of nitrogen gas. A sample resulting from the heat treatment was cooled naturally to room temperature. The obtained sample was mixed with a 3 M aqueous solution of sulfuric acid, after which the mixture was stirred at room temperature for 24 hours, followed by acid treatment. After the reaction was completed, a catalyst was separated from the acid solution using a ceramic filter, and at the same time washed 5 times with tertiary distilled water to remove the remaining acid solution. The collected catalyst was dried in an oven at 70° C. for at least 12 hours.

Thereafter, the dried catalyst was additionally heat-treated in a tube furnace at 800° C. for 1 hour under a flow of argon gas.

Example 2

Half-Cell Manufacturing and Electrochemical Property Evaluation

Each transition metal catalyst obtained in Example 1, a Nafion 5 wt % solution, and isopropyl alcohol were mixed to make a catalyst ink. The obtained catalyst ink was placed on a glassy carbon electrode (rotating disk electrode (RDE), material: glassy carbon) and then dried at room temperature to evaporate the alcohol.

At this time, the amount of the catalyst placed on the electrode was limited to 0.126 mg. The electrochemical properties of the catalyst were analyzed in a three-electrode system. Ag/AgCl electrode was used as a reference electrode, and glassy carbon was used as a counter electrode.

To measure the electrochemical properties, oxygen reduction reaction (ORR), oxygen evolution reaction (OER), hydrogen evolution reaction (HER), and hydrogen oxidation reaction (HOR) tests were performed, and the ORR test conditions are as follows.

First, an electrolyte solution was saturated with oxygen and oxygen was continuously fed during the measurement. The scan rate was 10 mV/sec, and the scan range was from 0.05 V to 1.1 V (vs. RHE). The rotation speed of the electrode was maintained at 1,600 rpm.

Meanwhile, the OER test conditions are as follows. An electrolyte solution was saturated with oxygen and oxygen was continuously fed during the measurement. The scan rate was 10 mV/sec, and the scan range was from 1.1 V to 1.8 V (vs. RHE). The rotation speed of the electrode was maintained at 1,600 rpm.

In addition, the HOR/HER test conditions are as follows. An electrolyte solution was saturated with hydrogen and oxygen was continuously fed during the measurement. The scan rate was 10 mV/sec, and the scan range was from –0.4 V to 1 V (vs. RHE). The rotation speed of the electrode was maintained at 1,600 rpm.

Example 3

(1) Test to Block Combustion Condition for Each Process Step

A combustion condition in which the transition metal was Fe and the amount of the support was 1.2 g in Example 1 was selected, and a test to block the combustion condition was performed in a total of five steps.

The five steps of blocking the combustion condition were set as follows: a middle stage of reaction, a late stage of reaction, termination of reaction, termination of reaction and termination of exothermic reaction of carbon, and limited blocking of the combustion condition in the middle stage of reaction.

Each step will be described in detail. First, the middle stage of reaction refers to a period in which the time for a combustion reaction is measured and the combustion condition is blocked after the reaction proceeds for half the time. The late stage of reaction refers to a period in which most of polyol is carbonized and evaporated but the combustion reaction of carbon does not proceed. The termination of reaction refers to a state in which an ignition reaction is terminated but an exothermic reaction of carbon still proceeds. The termination of reaction and the termination of the exothermic reaction of carbon refers to a state in which the exothermic reaction of carbon still proceeding after the termination of the ignition reaction is also spontaneously terminated. The limited blocking of the combustion condition refers to a method in which oxygen is limitedly supplied by covering a reactor with a container through which air passes in the middle stage of reaction.

Through such tests, it was confirmed that the oxidation of transition metal can be controlled by blocking the combustion condition in multi-stage manner.

(2) Half-Cell Manufacturing and Electrochemical Property Evaluation

An ORR test was performed in the same manner as in Example 2 described above.

Experimental Example: Confirmation of Characteristics of Synthesized Composite Transition Metal Catalyst (1) XRD Analysis Result of Transition Metal Catalyst The XRD analysis results of transition metal catalysts ((a) of FIG. 2) and a sample ((b) of FIG. 2, iron-nitrogen-carbon black) for each step synthesized according to Example 1 are illustrated in FIG. 2.

Referring to (a) of FIG. 2, it can be seen that in the XRD patterns of the final transition metal catalysts, no other impurity phases are detected, and fine peaks for metal crystals are observed.

This is believed to be due to the fact that the XRD signal is weak and broad because nanoparticles have a very fine size and a small particle size distribution. This conclusion will be reconfirmed through SEM analysis, which will be described later.

The XRD analysis result of the sample for each step in the process of synthesizing iron-nitrogen-carbon black is illustrated in (b) of FIG. 2.

From the XRD analysis result, it can be seen that iron oxide is produced after a combustion reaction and iron metal and iron-nitrogen crystals result as iron ions are reduced after primary heat treatment. The peaks for iron metal and iron-nitrogen crystals disappear in the XRD pattern of the sample resulting from acid treatment, and the sample resulting from secondary heat treatment exhibits the same pattern as that of the sample resulting from the acid treatment. This result is believed to be due to the fact that iron transition metal, which was oxidized due to the initial combustion reaction, is reduced by surrounding carbon during the heat treatment, and the iron metal and iron-nitrogen crystals not protected by carbon layers are dissolved in acid and removed during the acid treatment. This means that the composite structure of the final material is not significantly affected in a subsequent washing process to remove the remaining acid and the secondary heat treatment process.

(2) SEM and EDS Analysis Results of Transition Metal Catalyst

An SEM image and EDS analysis result of a transition metal catalyst synthesized according to Example 1 are illustrated in FIG. 3.

From the SEM image of the transition metal catalyst, it can be observed that about 10 nm particles are evenly distributed on a carbon support.

However, it was difficult to ascertain the structure of the catalyst through the simple SEM image. Accordingly, EDS analysis was performed, and it was confirmed that the particles were made of iron and nitrogen was present on the carbon support. In addition, this result shows that a transition metal catalyst of an appropriate size can be synthesized when the synthesis is performed by the method according to the present disclosure.

(3) XPS and XAS Analysis Results of Transition Metal Catalyst

XPS and XAS analysis results of the transition metal catalyst synthesized according to Example 1 are illustrated in FIG. 4.

First, from the XPS nitrogen spectrum (left) of the transition metal catalyst, it can be seen that a peak indicating a bond between iron and nitrogen is observed, which indicates that a bond structure in which iron and nitrogen are connected exists in the material.

In addition, from the XAS analysis result (right) of Example 1, it can be seen that a peak at 1.5 Å observed in the inner graph indicates a bond between iron and nitrogen, and a peak at 2.1 Å indicates a bond between iron and iron. From the fact that the two peaks exist simultaneously in the XAS graph and from the previous XRD and XPS results, it can be confirmed that a composite structured catalyst in which a single-atom transition metal-nitrogen bond structure and transition metal nanoparticles encompassed by carbon layers exist simultaneously was made.

(4) Evaluation of Electrochemical Reaction Activities of Synthesized Composite Structured Catalyst The experimental result of the half-cell manufactured according to Example 2 using the composite structured catalyst synthesized according to Example 1 is illustrated in FIG. 5.

As a result of checking an ORR reaction in a 0.1 M KOH aqueous solution illustrated in a of FIG. 5, it was confirmed that composite structured catalysts synthesized with various transition metals according to Examples exhibited excellent performance in the ORR reaction.

As for the half-wave potential used as an indicator of performance, the respective catalysts of iron, copper, nickel and cobalt exhibited 0.94 V, 0.83 V, 0.79 V, and 0.85 V.

As a result of checking an OER reaction in the 0.1 M KOH aqueous solution illustrated in b of FIG. 5, it was confirmed that the composite structured catalysts synthesized with various transition metals according to Examples exhibited excellent performance in the OER reaction.

As for the voltage at a current density of 10 mA·cm$^{-2}$ used as an indicator of performance, the respective catalysts of iron, copper, nickel, and cobalt exhibited 1.6 V, 1.7 V, 1.7 V, and 1.8 V.

As a result of checking an HER reaction in the 0.1 M KOH aqueous solution illustrated in c of FIG. 5, it was confirmed that the composite structured catalysts synthesized with various transition metals according to Examples exhibited excellent performance in the HER reaction.

As for the onset voltage (voltage at a current density of −0.1 mA·cm$^2$) used as an indicator of performance, the respective catalysts of iron, copper, nickel, and cobalt exhibited −0.24 V, −0.38 V, −0.14 V, and −0.10 V.

As a result of checking an HOR reaction in the 0.1 M KOH aqueous solution illustrated in d of FIG. 5, it was confirmed that the composite structured catalysts synthesized with various transition metals according to Examples exhibited excellent performance in the HOR reaction.

As for the current density at a voltage of 0.05 V used as an indicator of performance, the respective catalysts of iron, copper, nickel, and cobalt exhibited 0.25 mA·cm$^2$, 0.36 mA·cm$^{-2}$, 0.67 mA·cm$^{-2}$, and 0.34 mA·cm$^{-2}$.

As a result of checking an ORR reaction in a 0.5 M $H_2SO_4$ aqueous solution illustrated in e of FIG. 5, it was confirmed that the composite structured catalysts synthesized with various transition metals according to Examples exhibited excellent performance in the ORR reaction in the acid aqueous solution. As for the half-wave potential used as an indicator of performance, the respective catalysts of iron, copper, nickel, and cobalt exhibited 0.78 V, 0.52 V, 0.46 V, and 0.73 V.

From such results, it can be said that the transition metal composite structured catalysts made through the present disclosure have excellent activity in the various electrochemical reactions listed above.

The reason for such high activity can be attributed to the above-described unique characteristics of the catalyst that the catalyst simultaneously has two active sites. Due to these characteristics, the catalyst has high price competitiveness and thus is expected to contribute to the commercialization of various electrochemical devices.

(5) Test to Block Combustion Condition for Each Process Step (a) of FIG. 6 is a schematic view of the process steps for blocking the combustion condition described in Example 3, illustrating 1). a middle stage of combustion reaction, 2). a late stage of combustion reaction, 3). termination of combustion reaction, 4). termination of exothermic reaction of carbon after termination of combustion reaction, and 5). limited air supply in the middle stage of combustion reaction.

As a result of analyzing the XRD pattern illustrated in (b) of FIG. 6, a pattern for iron metal particles near 44 and 65 degrees and a pattern for FeN crystals near 43, 51, and 75 degrees were observed.

The results show that the later the blocking of the combustion condition, the more Fe metal and FeN crystals are formed.

As a result of analyzing the XRD pattern illustrated in (c) of FIG. 6, a pattern for iron metal particles near 44 and 65 degrees and a pattern for FeN crystals near 43, 51, and 75 degrees were observed in all samples except the sample 4).

The results show that the later the blocking of the combustion condition, the more severe a pattern change occurs before and after acid treatment. This indicates that the later the blocking of the combustion condition, the more transition metal nanoparticles and a transition metal-nitrogen bonding structure that can be protected from acid are formed.

In addition, in the case of the sample 5) where the combustion condition was limitedly blocked, it was confirmed that both the transition metal nanoparticles and the transition metal-nitrogen bonding structure were protected from acid.

As a result of analyzing the ORR characteristic curve illustrated in FIG. 7, the half-wave potential was excellent in the order of 3) of 0.917 V, 5) of 0.905 V, 2) of 0.902 V, 1) of 0.892 V, and 4) of 0.89 V, and the sample 3) where the combustion condition was blocked after the termination of the combustion reaction exhibited the best characteristics.

(6) Review of Results

By the transition metal electrochemical catalyst synthesis method using the ultrafast combustion method according to the embodiment of the present disclosure, it is possible to synthesize the composite structured catalyst in which the single-atom transition metal-nitrogen bonding structure and the transition metal nanoparticles encompassed by carbon layers exist simultaneously.

From experimental data obtained later, it was confirmed that the catalyst of such structure was synthesized. It was also confirmed that the catalyst prepared according to the present disclosure had excellent activity in various electrochemical reactions. This indicates that the catalyst having two active sites is advantageous as an electrochemical catalyst due to its structure, and the synthesis method proposed in the present disclosure is a method that enables synthesis of highly active catalysts.

Thus, it is believed that the synthesis method according to the present disclosure is advantageous when applied to electrochemical devices requiring high performance, and since it uses transition metals that are cheaper than noble metals, can greatly contribute to the commercialization of electrochemical devices.

It is also believed that the synthesis method proposed in the present disclosure can be utilized when mass-synthesizing rapidly high-performance transition metal catalysts.

Although exemplary embodiments have been described it will be readily understood by those skilled in the art that various modifications and changes can be made thereto without departing from the spirit and scope of the present disclosure defined by the appended claims.

A transition metal electrochemical catalyst prepared using an ultrafast combustion method, and a synthesis method therefor according to the present disclosure provide a catalyst having excellent electrochemical properties as a catalyst electrode due to its structure in which a single-atom transition metal-nitrogen bonding structure and transition metal nanoparticles encompassed by carbon layers, which serve as different electrochemical reaction active sites, are supported on the carbon surface. The present disclosure not only simplifies the complicated processes required to simultaneously form the above-mentioned active sites by utilizing the ultrafast combustion method, but also suppresses a part of the oxidation reaction of transition metals occurring during a synthesis process by simultaneously providing an oxidizing atmosphere and a reducing atmosphere. Therefore, the present disclosure has industrial applicability.

What is claimed is:

1. A method of synthesizing a transition metal electrochemical catalyst, the method comprising:
    dissociating a nitrogen precursor and a transition metal precursor in a polyol-based solvent so as to prepare a solution in which transition metal ions and free radical anions are coordinated, and mixing the solution with a support so as to prepare a mixture;
    igniting the mixture having been prepared in step a) so as to carbonize the polyol-based solvent, thereby forming transition metal nanoparticles encompassed by carbon;
    performing heat treatment in order to carbonize remaining organic matter contained in the mixture; and
    removing, through acid treatment, impurities and transition metal nanoparticles not encompassed by carbon, and then removing remaining acid through washing and reheat treatment, whereby a nanocatalyst having a structure in which a single-atom transition metal-nitrogen bonding structure and/or transition metal nanoparticles encompassed by carbon exists is synthesized.

2. The method of claim 1, wherein the polyol-based solvent is any one selected from the group consisting of tetraethylene glycol, ethylene glycol, diethylene glycol, triethylene glycol, and butylene glycol.

3. The method of claim 1, wherein the nitrogen precursor is a monomer of multi-ring structure containing nitrogen, and is 1,10-phenanthroline, 1,10-phenanthroline-5-amine, or 2,2-bipyridine.

4. The method of claim 1, wherein the support is any one selected from the group consisting of is carbon black, graphene, carbon nanotubes, carbon nanofibers, silica ($SiO_2$), titania ($TiO_2$), zirconium oxide ($ZrO_2$), polyaniline, polypyrrole, and silicon carbide (SiC).

5. The method of claim 1, wherein the transition metal precursor and the nitrogen precursor are mixed in a molar ratio of 1:0.5 to 1:10.

6. The method of claim 1, wherein the support and the polyol-based solvent are mixed in a mass ratio of 1:2 to 1:60.

7. The method of claim 1, wherein the transition metal precursor is a transition metal in the 3rd to 5th periods.

8. The method of claim 1, wherein the igniting is performed by blocking a combustion condition in order to control the degree of carbonization of the polyol-based solvent and the degree of oxidation of the transition metal.

9. The method of claim 1, wherein the heat treatment is performed at a temperature of 500° C. to 1,000° C. for 30 minutes to 12 hours under a flow of inert gas or ammonia gas.

10. The method of claim 9, wherein the inert gas is any one selected from the group consisting of nitrogen ($N_2$), argon (Ar), helium (He), a mixed gas of inert gas and hydrogen ($H_2$), and ammonia gas.

11. The method of claim 1, wherein the acid treatment is performed at a temperature of 0° C. to 90° C. for 30 minutes to 12 hours.

12. A transition metal electrochemical catalyst synthesized by the method according to claim 1.

* * * * *